United States Patent

[11] 3,614,753

[72] Inventor Sven E. Wahlstrom
Palo Alto, Calif.

[21] Appl. No. 875,240
[22] Filed Nov. 10, 1969
[45] Patented Oct. 19, 1971
[73] Assignee Shell Oil Company
New York, N.Y.
Continuation-in-part of application Ser. No. 825,257, May 16, 1969.

[54] SINGLE-RAIL SOLID-STATE MEMORY WITH CAPACITIVE STORAGE
3 Claims, 3 Drawing Figs.

[52] U.S. Cl. .......... 340/173 R, 307/238, 307/279, 317/235 B
[51] Int. Cl. .......... G11c 11/40, H03k 3/26
[50] Field of Search .......... 340/173, 173 FF; 307/238, 279; 317/235 (21.1)

[56] References Cited

UNITED STATES PATENTS

| | | | |
|---|---|---|---|
| 3,011,155 | 11/1961 | Dunlap | 340/173 |
| 3,355,720 | 11/1967 | Kaufman | 340/173 |
| 3,373,295 | 3/1968 | Lambert | 340/173 |
| 3,387,286 | 6/1968 | Dennard | 340/173 |
| 3,445,823 | 5/1969 | Petersen | 340/173 |
| 3,475,735 | 10/1969 | Aecher | 340/173 |

*Primary Examiner*—Terrell W. Fears
*Attorneys*—J. H. McCarthy and Theodore E. Bieber

ABSTRACT: A one-device-per-bit random-access memory array is constructed with integrated-circuit transistors as the memory cell switching elements. The transistors used are bidirectionally conductive and have a beta of at least two in both directions. Information transfer is accomplished by transferring incremental charges between the collector-to-substrate capacitance of the transistor and the bit line capacitance.

INVENTOR.
SVEN E. WAHLSTROM

BY

Mellin, Moore & Weissenberger
ATTORNEYS

SINGLE-RAIL SOLID-STATE MEMORY WITH CAPACITIVE STORAGE

CROSS-REFERENCE TO RELATED APPLICATION

This case is a continuation-in-part of application Ser. No. 825,257, filed May 16, 1969, and entitled Single-Rail MOSFET Memory with Capacitive Storage.

BACKGROUND OF THE INVENTION

In the aforementioned copending application, it was disclosed that a one-device-per-bit memory array could be constructed using MOSFET (metal oxide silicon field effect transistor) technology and a destructive reading process, in which reading was accomplished by transferring incremental charges from a memory capacitance associated with the individual bit MOSFET to the bit line capacitance of a bit line interconnecting corresponding-order bits of all the words in the memory array.

The teaching of the present continuation-in-part extends the teaching of the parent application to bipolar solid-state devices such as transistors in lieu of the unipolar MOSFETs. The term "bipolar devices" as used herein denotes devices whose operation involves current flow not only in the controlled circuit (i.e., the emitter-collector circuit of a transistor) but also between the control element and the controlled circuit (i.e., base-emitter or base-collector current). For certain uses, bipolar transistors are superior to MOSFETs in this type of circuitry because of their faster response time and lower operating voltage levels. Furthermore, MOSFET circuits either require MOSFET-sensing circuits incorporated in the chip, with a consequent loss of sensitivity, or external bipolar-sensing amplifiers, with an attendant complication of the manufacturing process. In a bipolar memory array, the bipolar-sensing amplifier can be directly incorporated in the chip.

SUMMARY OF THE INVENTION

The invention presupposes the use of integrated transistors possessing a very high degree of isolation from the substrate. In this type of transistor, the collector-to-substrate capacitance is usually much larger than the emitter-to-substrate capacitance. Consequently, the collector-to-substrate capacitance is used as a memory capacitance. If desired, additional capacitance may be provided by increasing the area of the collector diffusion or by providing an insulated, grounded metallic overlay above the collector diffusion as suggested in the parent application.

Although there are other ways of designing a reliable memory of this type, as long as the critical parameters are consistent between the devices, the transistors of the inventive array are preferably designed, in accordance with conventional semiconductor techniques, to have betas as equal as possible in the forward and rearward biased directions; consonant, however, with the requirement that the reverse-biased beta be about 2 or better. Lower reverse betas are possible, but they tend to make the tolerances for the remaining circuit components too strict, as will be hereinafter explained.

The transistors of the inventive array are operated at very low-current levels. Consequently, the limiting factor, as far as the charging and discharging parameters of the memory capacitance are concerned, is not so much the reverse beta of the transistor as the magnitude of the memory pulse or the restore pulse itself.

Finally, the timing of the read strobe or pulse is important in the circuit of this invention. As will be hereinafter explained in more detail, the circuit of this invention tends to reach, during the read portion of the cycle, an optimum reading condition which then deteriorates until, if the read cycle persists long enough, a false reading will occur.

With these factors in mind, the physical connection of the array of the present continuation-in-part is essentially identical to the connection of the array of the parent application. In the transistor version, the transistor base and its base resistor replace the gate of the MOSFET, and the emitter-collector circuit of the transistor replaces the source-drain circuit of the MOSFET. Although, in the embodiment of the drawings, the emitter is shown on the bit line side and the collector on the memory capacitance side, and such connection is preferable, it is not absolutely necessary and the teaching of the invention can be carried out with the opposite connection.

It is therefore the object of the invention to provide a random-access memory array using a single semiconductor device per bit and accomplishing the reading operation by transferring incremental charges from a capacitance preferably integrated with the semiconductor device to the capacitance of a bit line common to several bits.

It is a further object of the invention to accomplish the foregoing object by the use of bipolar devices such as transistors.

DESCRIPTION OF THE PREFERRED EMBODIMENT

Figures 1, 2, 3:
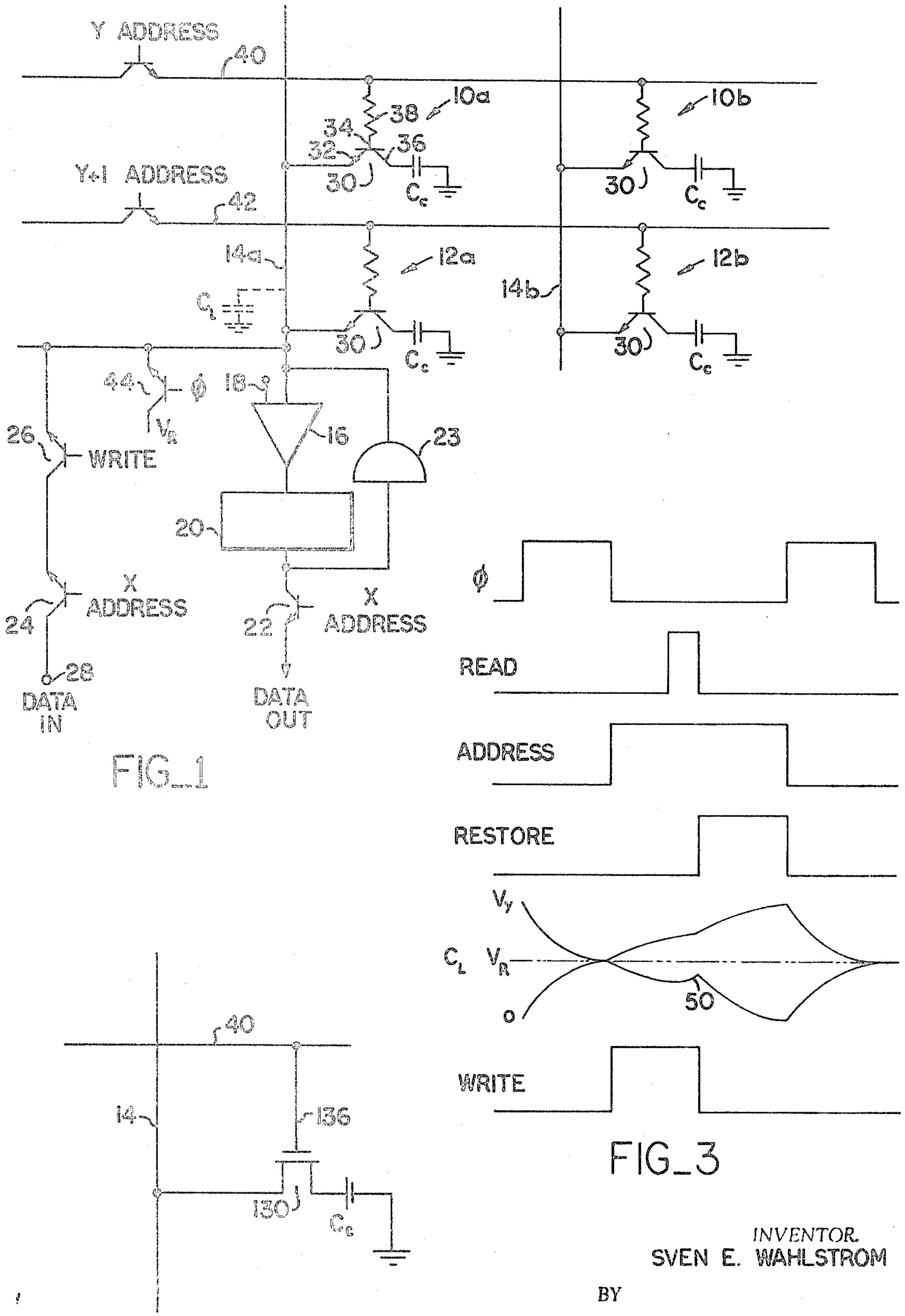
FIG. 1 is a partial circuit diagram of a random access memory array constructed in accordance with the invention and illustrating the preferred embodiment of the present continuation-in-part.
FIG. 2 is a partial circuit diagram illustrating the manner in which the parent application differs from the circuit of the present continuation-in-part.
FIG. 3 is a time-amplitude diagram illustrating the wave forms used in the device of the present continuation-in-part.

In the circuit diagram of FIG. 1, the random access memory array of this invention is shown to consist of individual memory cells 10*a*, 10*b* and 12*a*, 12*b*. The memory cells 10*a*, 10*b* represent two bits of a given word or row of cells, whereas the cells 10*a*, 12*a* represent two bits of a column of cells, the cells 10*a*, 12*a* representing bits of the same order in two consecutive words of the same array.

Each column of cells has a bit line 14 (such as 14*a*, 14*b*) associated therewith. Each bit line 14 is connected to the input of a sense amplifier 16 of conventional construction. The sense amplifier is triggered for reading by a read strobe 18. The output of the sense amplifier 16 is connected to a conventional memory flip-flop circuit 20. The flip-flop circuit 20 sets up an output data condition which can be read by enabling the data-out read gate 22.

Inasmuch as the reading of the circuit of this invention is destructive, the output of the memory flip-flop is also fed to a restore logic circuit 23 which, following a read operation, impresses on the bit line 14 a restore signal of a level suitable for restoring to the cell the information previously read out of it. It will be understood that each of the bit lines 14*a*, 14*b* of the array has associated therewith a separate set of actuating circuitry including a sense amplifier, memory flip-flop, restore logic, and read, write, X-address and precharge gates.

In a writing operation, the read signal on bit line 14 produced by addressing a given cell is overridden by energizing the appropriate X-address gate 24 and write gate 26. This connects the bit line 14 directly to the low-impedance data source 28 and causes the sense amplifier 16, flip-flop 20 and restore logic 23 to restore into the addressed cell the information conveyed by the data source 28.

Each of the memory cells 10, 12 consists of a transistor 30 having an emitter 32, a base 34 and a collector 36. The transistor 30 is preferably of the integrated-circuit type and is deposited on a substrate (shown as ground in the drawing) from which it is electrically isolated (as shown by the capacitance $C_c$ in the drawing). A limiting resistor 38 is connected between the base 34 of each transistor 30 and the word-select line 40 or 42 corresponding to that transistor. The resistor 38 is preferably integrated into the circuit together with the transistor 30.

Due to the isolation of the transistor 30 from the substrate, a capacitance exists between the electrodes of the transistor 30 and the substrate. This capacitance is generally largest between the collector 36 of the transistor 30 and the normally grounded substrate. Consequently, it is this collector-to-substrate capacitance $C_c$ which is utilized as the memory capacitance. It will be understood, however, that the capacitance $C_c$ may be enhanced by various techniques, such as by the use of an additional diffusion area or of a grounded metallic overlay insulated from the collector diffusion and located above it.

The bit line 14 has an inherent capacitance $C_L$ (represented as a lump capacitance by dotted lines in the drawing) which is generally about an order of magnitude larger than the capacitance $C_c$. It is the transfer of charge between the capacitance $C_c$ and the capacitance $C_L$ which underlies the operation of the circuit.

The operation of the circuit is as follows: The appearance of the precharge pulse $\Phi$ enables precharge gate 44 and precharges the bit line 14 to the reference voltage $V_r$ which may be one-half of the voltage $V_v$ representing a logic "1."

Following the end of the precharge pulse $\Phi$, a ," line (say line 40) is energized by an appropriate address pulse (FIG. 3). The address pulse is of larger amplitude than the reference voltage $V_r$, and a base current is caused to flow from the word-select line 40 through the limiting resistor 38 and the base 36 of the transistor 30 of cells 10*a*, 10*b*, and through the emitter 32 of the transistor 30 to the bit line 14, which is being maintained at the precharge level $V_r$ by its inherent capacitance $C_L$. If the memory cell, say cell 10*a*, is at logic "1," its memory capacitance $C_c$ will discharge through the collector-emitter circuit of the transistor 30 into the line capacitance $C_L$ of bit line 14*a*. The combined effect of the discharge current from the memory capacitance $C_c$ and the base-emitter current in the transistor 30 is to raise the voltage level in the bit line 14*a* above $V_r$. After sufficient time has elapsed to produce a significant raise in the voltage level of $C_L$, the sense-amplifier is actuated by means of a read pulse (FIG. 3) from the read strobe input 18, and the information in the memory cell is sensed.

If, on the other hand, the memory capacitance $C_c$ was at logic "0," the enabling of the transistor results in charge being transferred from the bit line capacitance $C_L$ into the memory capacitance $C_c$ through the emitter-collector circuit of the transistor 30. In the circuit of this invention, the transistor 30 is operated at very low current levels; consequently, as long as the reverse beta of the transistor is greater than 1, a substantial amount of charge will be transferred from the line capacitance $C_L$ to the memory capacitance $C_c$, and the potential of the bit line capacitance $C_L$ will drop below the level of $V_r$.

In this condition, however, the timing of the read pulse is significant. As the voltage of the memory capacitance $C_c$ approaches the level of the bit line capacitance $C_L$, the base current flowing from the word-select line 40 to the bit line 14*a* becomes increasingly significant. Eventually, a point is reached where the bit line capacitance $C_L$ ceases to discharge, and both capacitances begin to be charged by the base current (See portion 50 of the lower $C_L$ curve in FIG. 3).

It will be seen that in order for the circuit to function with an acceptable degree of reliability, the time constant of the base resistor-bit line capacitance combination should be significantly longer than the time required for a significant discharge of the bit line capacitance $C_L$ into the memory capacitance $C_c$. As the RC time constant of the base circuit is decreased with respect to the charging time of memory capacitance $C_c$, the accuracy of the base resistors 38 in the individual memory cells becomes more and more critical. Consequently, and taking into account the normal manufacturing tolerances for integrated circuit resistors, the reverse beta of the transistor should be in practice at least two.

As previously observed, the actual value of the beta of the transistor is relatively unimportant because of the very low current levels at which the device operates. If, however, it is desired to operate the device at a higher current density, then the actual value of the transistor beta may become a significant factor, and in that case, the transistors 30 should be designed to have higher values of beta than the aforementioned practical minimum.

Following the reading operation, the bit line 14 is brought to the logic level determined by the restore logic circuit 23, and the memory capacitance $C_c$ is appropriately charged or discharged, as the case may be, through the transistor 30. The timing of the restore operation is not critical like the timing of the read operation, because the low impedance input from the restore circuit maintains the bit line 14 at a forced restore level, and the current flow in the memory capacitance $C_c$ does not reverse as it does during the reading operation in a reverse bias direction.

Although, in the preceding description, the reference voltage level $V_r$ has been assumed to be equal to the precharge level on bit line 14, it should be understood that $V_r$ may differ from the precharge level without affecting the operation of the circuit. In fact, the circuit will operate reliably whenever the discharge voltage on the bit line 14 is significantly different for a "1" condition, as opposed to a "0" condition, at the time of strobing.

It will be noted from the foregoing description that the operation of the circuit of this invention is analogous, functionally speaking, to the operation of the circuit of the parent application illustrated in FIG. 2. At the current levels envisioned in the operation of the circuit, the transistor 30 functions essentially like a bidirectional gate, in the same manner as the MOSFET 130 of FIG. 2. In the transistor version, of course, the base 36 functions in the same manner as the insulated gate 136 in the MOSFET circuit.

I claim:

1. A clock-operated random access solid-state read/write memory array, comprising:

a. for each bit, a transistor having an information storage capacitance integrally formed with one of the electrodes of the emitter-collector circuit thereof on a grounded substrate;

b. bit line means interconnecting the other electrode of the emitter-collector circuit of a plurality of said bit transistors;

c. information processing circuitry including information-sensing means, means for preserving sensed information and producing a restoring signal in accordance with said sensed information, and data input and output means;

d. three-phase clock pulse generating means;

e. read gate means operated by first-phase clock pulses to connect said sensing means to said bit line means;

f. restore gate means operated by second-phase clock pulses to connect said restoring-signal-reproducing means to said bit line means;

g. write gate means operated by second-phase clock pulses to connect said data input means to said bit line means;

h. preset gate means operated by third-phase clock pulses to connect said bit line means to ground potential; and i. address means arranged to gate selected ones of said bit transistor into conduction during said first phase and second phase clock pulses.

2. The memory array of claim 1 in which the transistors have a reverse-biased beta ranging upwardly from 2.

3. The memory array of claim 2 in which the forward and reverse-biased betas of said transistor are substantially equal.